Figure 1:
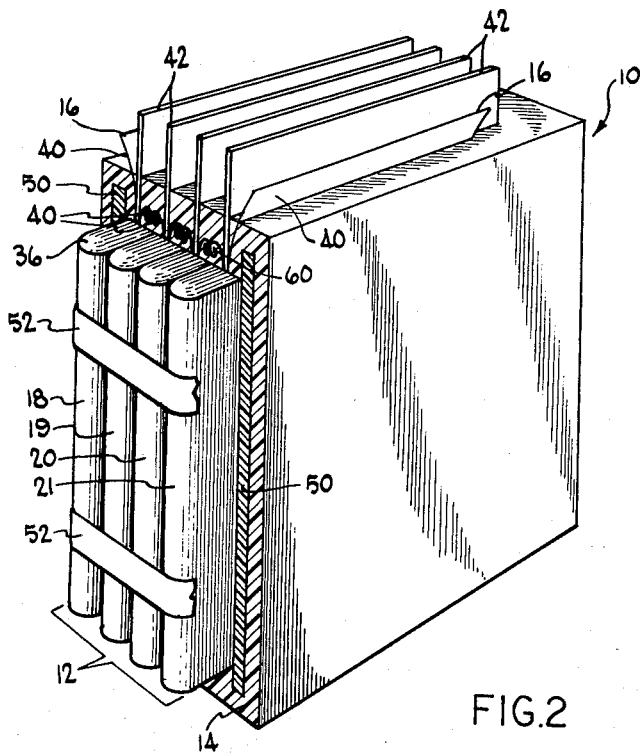

United States Patent [19]
King

[11] 3,711,746
[45] Jan. 16, 1973

[54] HIGH VOLTAGE ENERGY STORAGE CAPACITOR

[75] Inventor: William M. King, Spring Valley, Calif.

[73] Assignee: Maxwell Laboratories, Inc., San Diego, Calif.

[22] Filed: June 16, 1971

[21] Appl. No.: 153,628

[52] U.S. Cl. .................................. 317/258, 317/260
[51] Int. Cl. .............................................. H01g 3/28
[58] Field of Search ...317/258, 260, 242; 174/52 PE; 29/25.42; 262/272

[56] References Cited

UNITED STATES PATENTS

| | | | |
|---|---|---|---|
| 2,125,413 | 8/1938 | Arnold | 29/25.42 |
| 2,526,688 | 10/1950 | Robinson | 317/258 X |
| 2,531,185 | 11/1950 | Worster | 317/260 |
| 2,949,640 | 8/1960 | Collins | 264/272 X |
| 3,016,481 | 1/1962 | Simpson | 317/260 X |
| 3,048,750 | 8/1962 | Netherwood | 317/258 |
| 3,165,568 | 1/1965 | Sternbeck | 264/272 |
| 3,209,217 | 8/1965 | Innis | 37/260 |
| 3,243,414 | 3/1966 | Dewitt | 264/272 |
| 3,275,914 | 8/1966 | Hoffman | 317/258 |
| 3,458,645 | 7/1969 | Braiman | 174/52 PE |
| 3,474,300 | 10/1969 | Pearce et al. | 317/242 X |
| 3,588,643 | 6/1971 | Ross | 317/260 X |
| 3,608,023 | 9/1971 | Scarborough | 264/272 |

FOREIGN PATENTS OR APPLICATIONS 848,440  9/1960  Great Britain

OTHER PUBLICATIONS

Marbury, "Power Capacitors" McGraw Hill 1949 N.Y. p.p. 30–31 Copy Group 215
Mellon "Three Insulation Barriers" in Insulation June 1968 pp 28–31 Copy 317-258

*Primary Examiner*—E. A. Goldberg
*Attorney*—Fitch, Even, Tabin & Luedeka

[57] ABSTRACT

A capacitor comprising an electrode and dielectric assembly, a polyurethane body encapsulating the assembly, and terminal means for providing electrical connection with the assembly through the polyurethane body. The electrode and dielectric assembly comprises metal electrodes which are separated by an absorbent dielectric material impregnated with a liquid dielectric fluid. The capacitor may be made by impregnating the electrode and dielectric assembly with castor oil liquid dielectric, and subsequently encapsulating the impregnated assembly with polyurethane plastic.

8 Claims, 3 Drawing Figures

PATENTED JAN 16 1973

3,711,746

INVENTOR
WILLIAM M. KING

Fitch, Even, Tabin, & Luedeka
ATTYS.

HIGH VOLTAGE ENERGY STORAGE CAPACITOR

The present invention is directed to capacitors. More particularly, the present invention is directed to high stress energy storage capacitors, and methods for manufacturing such capacitors.

Capacitors suitable for energy storage under conditions of high electrical stress are an important element of electrical systems involving the accumulation, storage, and pulsed discharge of high voltage electrical energy. Such capacitors are employed, for example, for energy storage in electromagnetic forming equipment, and in Marx generators.

It has been increasingly important that capacitors used for high voltage energy storage have a high level of performance properties. As the simultaneous achievement of these performance properties involves somewhat conflicting technical considerations, there have been difficulties in providing capacitors having the combination of performance properties of the levels required for effective utilization of high voltage storage and discharge technology. For example, such energy storage capacitors should have a high charge voltage capability, and a high life expectancy in terms of number of charge and discharge cycles before failure. In addition, however, such capacitors should also be able to withstand a high voltage gradient without breakdown, and it is particularly important that such capacitors have a high energy storage density in terms of energy storage capability per unit weight. Furthermore, such capacitors should be sufficiently economical to permit practical commercial use.

Accordingly, it is an object of the present invention to provide a capacitor for high voltage, high energy density storage. It is a further object to provide a capacitor having a high voltage gradient capability, as well as high reliability and lift expectancy. It is still another object to provide such a capacitor which is practical and economical.

Figure 2:
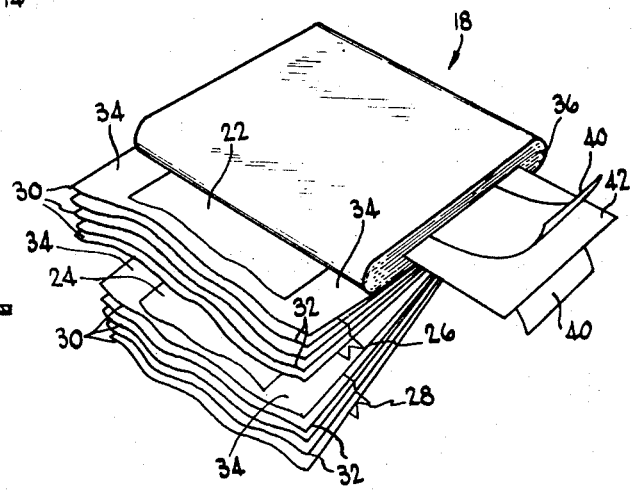
Figure 3:
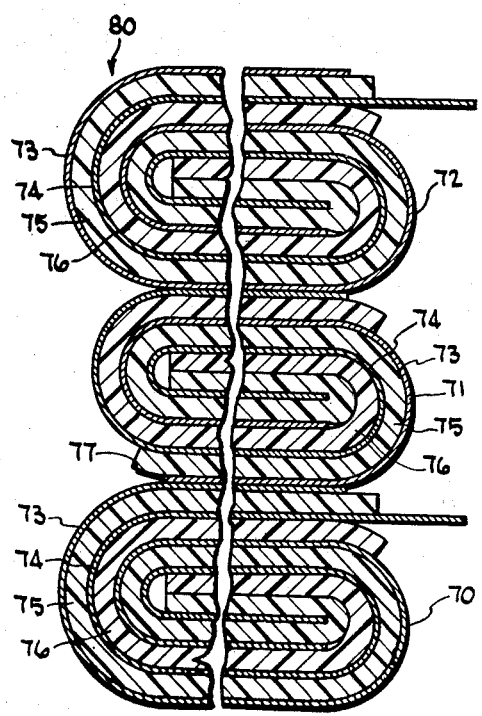

These and other objects of the invention are more particularly set forth in the following detailed description and in the accompanying drawings of which FIG. 1 is a perspective view, partially broken away, of a capacitor in accordance with an embodiment of the present invention;

FIG. 2 is a perspective view of a partially wound capacitor section and electrode and dielectric assembly of the capacitor of FIG. 1, and FIG. 3 is a schematic cross-sectional view of an electrode and dielectric assembly in accordance with another embodiment of the present invention.

Generally, the present invention is directed to a capacitor comprising an electrode and dielectric assembly, a polyurethane body encapsulating the assembly, and terminal means for providing external electrical connection with the assembly through the polyurethane body. The electrode and dielectric assembly comprises metal electrodes separated by an absorbent dielectric material impregnated with a liquid castor oil dielectric fluid.

The electrode and dielectric assembly is advantageously made up of one or more capacitor sections which generally are constructed using thin metal foil electrodes wound with thin, separating, dielectric layers in order to achieve a high ratio of electrode surface area to unit volume. The thin intermediate dielectric layers separating the metal foil electrodes comprise an absorbent material such as capacitor paper which is impregnated with castor oil liquid dielectric. Preferably, the thin intermediate dielectric layers are composite structures comprising alternating layers of capacitor paper and an impermeable plastic such as polyethylene terephthalate (commonly known under the tradename MYLAR). When the electrode and dielectric assembly is made up of a plurality of capacitor sections, the sections are preferably connected in series so that the charge voltage characteristic of the finished capacitor is increased.

The capacitor of the present invention will now be more fully described with respect to the embodiment illustrated in FIGS. 1 and 2 of the drawings.

Illustrated in FIG. 1 is a perspective view of capacitor 10 which has been partially broken away to expose its internal construction. The capacitor 10 comprises an electrode and dielectric assembly 12, a polyurethane body 14 encapsulating the assembly 12, and terminal means 16 for providing external electrical connection with the assembly 12 through the polyurethane body 14. The electrode and dielectric assembly 12 itself is made up of four capacitor sections 18, 19, 20 and 21. The construction of these capacitor sections is shown in more detail in FIG. 2, which is a perspective view of one of the capacitor sections 18, partially wound, prior to stacking and series connection to form the assembly 12.

The capacitor section 18 illustrated in FIG. 2 is constructed from two metal electrodes 22 and 24 which in the illustrated embodiment are sheets of aluminum foil having a uniform thickness of between about 0.00013 inch and about 0.002 inch, and preferably about 0.0005 inch. The aluminum foil electrodes 22 and 24 are separated by two identical dielectric interlayers 26 and 28 which are each a composite dielectric structure made up of alternating layers of absorbent dielectric sheet material 39 and impermeable organopolymeric film 32. In the illustrated embodiment, the absorbent dielectric sheet material is capacitor grade kraft paper having a thickness of between about 0.0002 inch and about 0.001 inch, and preferably about 0.0003 inch. The impermeable organopolymeric dielectric film is capacitor grade polyester film, such as a polyethylene terephthalate sold under the tradename MYLAR having a thickness of between about 0.00025 inch and about 0.002 inch, and preferably about 0.0005 inch. The paper 30 and MYLAR 32 sheets are in the form of long strips of equal width, and three paper 30 strips and two MYLAR 32 strips are alternately arranged with their longitudinal edges parallel and adjacent to form each of the dielectric interlayers 26 and 28. The paper strips 30 form the outside surfaces of each of the dielectric interlayers, which are also in the form of a long strip having a width equal to that of its component paper 30 and MYLAR 32 layers.

The two aluminum foil electrodes 22 and 24 are also in the form of long strips, and have a width narrower than the width of the dielectric interlayers 26 and 28 so that the dielectric interlayers will overlap the edges of the foil in the finished capacitor section. The two aluminum foil electrode strips 22 and 24 are assembled in alternating, parallel relationship with the two composite dielectric strips 28 and 32 so that both longitudinal edges of each of the dielectric strips extend beyond the longitudinal edges of each of the aluminum foil electrode strips to provide insulating dielectric margins 34 to insure the electrical reliability of the capacitor sections.

As may be seen in FIG. 2, the capacitor section 18 is constructed by winding the alternatingly assembled electrode and dielectric strips to form a flattened, generally rectangular, pad-shaped structure in which the foil electrodes 28 and 32 are separated from each other on each side by the dielectric interlayers 30 and 32. In keeping with conventional practice, the dielectric strips are not only wider than the aluminum foil electrodes but are also longer than the aluminum foil electrodes so that the first and final turns (dead turns) of the winding are made with only the dielectric strips. In this manner, the electrodes are provided with insulating end margins (not shown) as well as the insulating side margins 34.

Also in accordance with conventional practice, two connecting tabs 40 are laid in at the midpoint of the winding to provide for electrical connection with the finished capacitor section. The two tabs 40 are sheets of aluminum foil which are preferably somewhat thicker than the electrodes 22 and 24. Each of the tabs 40 extends into the top end 36 of the capacitor section 18 along the axis of the winding so that it lies in contact with only one of the wound aluminum foil electrodes 22 or 24 and so that each of the electrodes 22 and 24 are provided with a tab connector.

An insulator 42 separates the tabs 40, which in the illustrated embodiment is made up of one or more MYLAR sheets which are wider than the tabs 40 so that insulating margins are provided between the tabs. The thickness of the MYLAR sheets of the insulator 42 should be greater than that of that employed in the dielectric interlayers 28 and 32. For example, the insulator may be made up of two sheets of 0.003 inch thick MYLAR, inserted into the winding between the tabs.

The number of turns of the electrodes wound to provide the capacitor section 18 may vary over a wide range; however, generally between about 10 and about 40 turns provides an effective and readily stackable capacitor section. In the embodiment of FIG. 1 the capacitor sections are finished by a winding (dead turn) of dielectric interlayers without the aluminum foil electrodes in order to insulate the finished capacitor section, and the ends of the dielectric interlayers may be secured to the winding in any suitable manner.

The dielectric interlayers, particularly including the capacitor paper components of the interlayers are fully impregnated with castor oil dielectric fluid.

As shown in FIG. 1, a plurality of castor oil impregnated capacitor sections 18, 19, 20 and 21 are connected to provide the electrode and dielectric assembly 12 of the capacitor 10 of FIG. 1. In the illustrated embodiment, four of the generally rectangular capacitor sections are aligned and stacked in an upright position with the flat surfaces of the sections adjacently positioned. A thin G 10 glass fiber epoxy resin plate 50 is placed adjacent each of the two flat exterior surfaces of the end capacitor sections 18 and 21. The stacked capacitor sections 18, 19, 20 and 21, and the G 10 fiber glass plates 50 are circumferentially wrapped with thin G 10 glass fiber tapes 52, in a plane parallel to the axes of the winding of capacitor sections 18, 19, 20 and 21.

The assembled capacitor sections in the electrodes and dielectric assembly are series connected in order to serially increase the charge voltage of electrode assembly 12 (and thus of capacitor 10) by increments equal to the charge voltage of the capacitor sections 18, 19, 20 and 21. In the illustrated embodiment of FIG. 1, this series connection is accomplished by means of the tab connectors 40. The tab connectors 40, with the exception of the two exterior tab connectors 16 of the two outer capacitor sections 18 and 21, are each in electrical connection with the adjacent tab connectors of the adjacent capacitor section.

In the illustrated embodiment, the interior tab connector aluminum foil sheets 40 are rolled and crimped together to meet in electrically connecting rolls 60 located between the MYLAR tab insulators 42 of the adjacent capacitor sections and adjacent the top surface of the electrode assembly 12 formed by the aligned top surfaces 36 of the capacitor sections 18, 19, 20 and 21. The exterior tabs 16 of the end capacitor sections extend from the electrode and dielectric assembly 12 through the polyurethane body 14 and act as terminals to provide for external electrical connection with the series connected electrode and dielectric assembly 12.

With the exception of the end portions of the MYLAR insulator tabs 42 of the stacked capacitor sections 18, 19, 20 and 21, and the end portion of the two end connector tabs 16 which serve as exterior terminals, the polyurethane body 14 completely encapsulates the entire electrode and dielectric assembly, the glass fiber-epoxy end plates 50, the glass fiber tapes 52, and the interior connecting rolls 60.

The end portions of the MYLAR insulators 42 of the four capacitor sections 18, 19, 20 and 21 project from the polyurethane body 14 to provide a dielectric barrier between the similarly projecting end portions of the connector tabs 16 which serve as capacitor terminals. These projecting MYLAR sheets serve to insulate and isolate the capacitor terminals from each other. An additional terminal structure (not shown) having conventional rail terminals (connected to the projecting tabs 16) and including a separate body (not shown) projecting between the rail terminals (fitting over or above the MYLAR insulator tabs) to prevent electrical leakage such as corona effects between the rails, may be useful in some situations.

The polyurethane body 14 accordingly serves to physically integrate the components of the capacitor 10 and to protect the capacitor structure. Furthermore, the polyurethane body provides additional electrical insulation for the capacitor structure, both with respect to the capacitor as a whole and with respect to the individual internal components of the capacitor. For example, the rolled connections 60 between the adjacent interior tab connectors of the capacitor sections are fully encapsulated in, as well as insulated and protected by, the polyurethane body.

Moreover, the polyurethane body effectively and permanently contains the liquid dielectric castor oil within the dielectric paper sheets 30 of the dielectric interlayers 26 and 28 separating the electrodes of the capacitor sections. Accordingly, there is no leakage of the liquid dielectric, and there are no bulky conventional cases and associated seals required. In addition, the amount of liquid dielectric employed in the capacitor is reduced to a minimum level which is most efficiently utilized since the liquid castor oil dielectric present in the capacitor is located within the dielectric interlayers separating the active capacitor electrodes.

It will be recognized by one skilled in the art that the particular design of the electrode and dielectric assembly, capacitor sections and terminal means of the capacitor illustrated in FIG. 1 may be varied to suit particular needs or uses. For example, a different number of capacitor sections may be used in various combinations of series and/or parallel connection to make up the electrode assembly, and the capacitor sections themselves may be of different or varied design. For example, the capacitor sections illustrated n FIGS. 1 and 2 may have much shorter MYLAR insulators 42 so that these tabs do not project from the polyurethane body of the capacitor If one of the end capacitor sections 18 is constructed so that the aluminum sheet connector tabs 40 do not both project from the top 36 of the winding, but rather, one of the tab connectors projects from the top 36 of the winding and one of the tab connectors projects from the bottom of the winding, upon series connection of the capacitor sections an electrode and dielectric assembly 12 may be provided with one of the terminals on the top of the assembly and the other terminal on the bottom of the assembly. Flat-surfaced terminals, or other types of couplings may be connected with the connector tabs and integrally molded into the top and/or bottom surfaces of the polyurethane body 14 of the capacitor 10. Also, the additional support and protection provided by the glass fiber tape and plates may be deleted, or alternatively may instead be increased by surrounding the polyurethane body which encapsulates the electrode assembly with a glass fiber-epoxy or other type of container.

Schematically illustrated in FIG. 3, in cross section, is another type of electrode and dielectric assembly which is also particularly suited for use in the high stress energy storage capacitors of the present invention. Rather than capacitor sections like those of FIG. 2 which use tab connections with the metal foil electrodes, the electrode and dielectric assembly 80 of FIG. 3 uses foil-to-foil contact of alternate electrodes to effect series connection of the wound capacitor sections 70, 71 and 72. Each of the capacitor sections 70, 71 and 72 is comprised of two electrodes 73 and 74 and two intermediate dielectric interlays 75 and 76, which are wound in alternating relationship such that exterior electrode 73 is wound as the outside layer of the capacitor section. The dielectric interlayers comprise alternate layers of MYLAR and capacitor paper. The dielectric interlayers are fully saturated with castor oil which serves as a liquid dielectric.

As is illustrated in FIG. 3, the capacitor sections are stacked to form the electrode and dielectric assembly 80. The interior electrodes 74 of the two end capacitor sections 70 and 72 of the assembly 80 extend from these sections as terminals for the assembly, and the foil electrodes of intermediate capacitor section 71 connect the two end sections 70 and 72 in series by foil-to-foil contact as shown in FIG. 3.

As described, the interior-wound foil 74 of end capacitor section 70 extends from the winding to serve as one terminal for the assembly. The exterior-wound foil 73 of the end section 70 abuts the exterior wound foil 73 of the middle section 71 and accordingly is in electrical connection therewith. The exterior-wound foil 73 of the middle section 71 however, does not extend beyond the zone of contact with the exterior wound foil of the end section 70.

The dielectric interlayers 75 next underlying the exterior-wound foil 73 of the middle capacitor section 71, extends only slightly beyond the external end 77 of the foil 73 of the middle section 71 (for purposes of insulation between electrodes) and accordingly this interior-wound foil 74 of the middle capacitor section is exposed on the opposite side of the section 71 where it is placed in contact with the exterior foil of the other end capacitor section 72. Since the interior-wound foil of the other end section 72 serves as the other connecting terminal for the assembly, it can be readily seen that the entire structure is in series connection. Of course, suitable modification of the illustrated sections, such as extending one foil terminal 73 around to the other side so that the terminals may be provided on opposite sides of the assembly, are within the skill of the art and may be advantageous in various circumstances. When encapsulated in polyurethane in accordance with the present invention, foil-to-foil electrode and dielectric assemblies such as illustrated in FIG. 3 provide excellent, high performance capacitors.

The present invention is also directed to a method for making capacitors. Generally, in the method, at least one capacitor section comprising metal electrodes separated by an absorbent dielectric is provided in an electrode and dielectric assembly. Preferably the capacitor section is wound from metal foil electrode strips separated by thin dielectric interlayers which are made up of alternating layers of capacitor paper and polyester film. The absorbent dielectric material such as the preferred capacitor paper and MYLAR layers separating the electrodes is impregnated with a castor oil liquid dielectric. The electrode assembly having the absorbent dielectric material impregnated with liquid dielectric is subsequently encapsulated in polyurethane plastic. During manufacture, the capacitor is provided with terminal means for electrical connection with the encapsulated electrode assembly.

For example, suitable electrode and dielectric assemblies such as illustrated in FIGS. 1, 2 and 3 may be provided for making a capacitor in accordance with the method of the present invention. The metal foil electrodes and the dielectric interlayers of alternating strips of paper and MYLAR are wound and assembled to provide the electrode and dielectric assembly. If tab construction of the capacitor section is used, the appropriate tabs are connected by soldering and/or rolling together and crimping, and if foil-to-foil contact is employed, the appropriate connections are made. If desired, the assembly may be held together and supported in a suitable manner such as by a container or glass fiber-epoxy end plates wrapped with glass filament tape.

The unimpregnated electrode and dielectric assembly is then completely dried. Any water present in the finished capacitor is deleterious to its performance and for best results it is necessary to thoroughly dry the electrode assembly. The drying step is carried out particularly to effect thorough drying of the capacitor paper of the dielectric interlayers. The drying is carried out at a temperature of from about 100°C. to about 150°C. under vacuum. Preferably the drying is carried out in a vacuum zone which is a vacuum mold designed for casting the electrode and dielectric assembly in the polyurethane encapsulation. The higher the vacuum under which the unit is dried, the more effective will be the drying operation, and preferably the drying is carried out at an absolute pressure of about 100 microns or less. Purging with a completely dry gas, such as dry nitrogen, may be helpful to facilitate the drying of the capacitor sections of the electrode and dielectric assembly. In order to thoroughly dry the assembly, and particularly the paper dielectric, the assembly is generally maintained under the conditions of heat and vacuum for from about 2 to about 48 hours.

After the electrode and dielectric assembly has been thoroughly dried the assembly is immersed in castor oil under vacuum so that the capacitor sections are covered with the liquid dielectric. This is readily accomplished by introducing the castor oil into the vacuum chamber containing the thoroughly dried electrode and dielectric assembly so that at least the windings of the capacitor sections are covered, and preferably the entire electrode assembly is covered. The castor oil should be of a grade, such as grade DB, which is suitable for use as a liquid dielectric and should be completely dry. The capacitor sections are immersed in the castor oil under vacuum so that the dielectric interlayers of the windings will be thoroughly and completely impregnated with the liquid dielectric. It is important that there be no voids or air-containing regions in the capacitor sections, particularly in the active zone of a capacitor section defined directly between the metal foil electrodes.

After the electrode assembly has been immersed in the castor oil, the vacuum is released so that the castor oil is forced throughout the windings of the capacitor section, thoroughly impregnating the paper dielectric sheets. This may be facilitated by the application of pressures above atmospheric, and additional cycles of the application and release of vacuum may be carried out to insure thorough and complete impregnation, particularly for large, tight windings having numerous turns of electrode and dielectric.

After the electrode and dielectric assembly, including the paper layers of the dielectric interlayers, has been thoroughly impregnated with castor oil, the free, or excess soil is removed. This may be done by pouring off the oil in which the electrode and dielectric assembly has been immersed, and thoroughly draining the excess oil from the assembly. The assembly may be centrifuged and/or wiped or blotted to insure complete removal of excess oil. In this regard, removal of excess oil is particularly advantageous. Excess oil not located in the active zone of the capacitor sections or in the insulating margins of the dielectric interlayers overlapping the electrodes, serves little or no useful purpose and adds unnecessary weight to the finished capacitor. Furthermore, excess oil such as would drain from the electrode and dielectric assembly in the mold prior to or during encapsulation with polyurethane, might in fact interfere with the encapsulation. Of course, care should be taken in this step to insure that the castor oil will not be removed from the absorbent dielectric paper to produce voids or air pockets, particularly in the active zones of the capacitor sections. In the windings, there should be continuous solid or liquid dielectric between the electrodes.

After the excess castor oil has been removed, the impregnated electrode and dielectric assembly is placed in a mold defining the desired exterior shape of the encapsulated capacitor, and is encapsulated in polyurethane plastic. If the finished capacitor section is to be removed from the mold, a suitable release agent may be provided. On the other hand, the "mold" may become an integral part of the capacitor body, as when the electrode and dielectric assembly is encapsulated in polyurethane within a suitable container such as a G 10 case. The mold containing the electrode and dielectric assembly should be placed under vacuum, again preferably as high a vacuum as practically possible, such as about 500 microns or less, and more preferably about 200 microns or less.

The polyurethane prepolymer casting mixture is then introduced into the mold containing the electrode assembly so that mold is filled and the electrode and dielectric assembly is covered with the polyurethane prepolymer.

The mold should be filled slowly, such as over a period of between about 10 min. to about 8 hours, so that the polyurethane prepolymer will be thoroughly degassed. After the mold is filled, the vacuum deaeration may be continued for about 2 hours or until the polyurethane prepolymer gels or is completely polymerized. During or prior to the casting step, provision is made for external terminals connecting with the electrode assembly through the polyurethane. This may simply involve having the connecting tabs or terminals extend above the top surface of the casting resin so that they will extend through the cured resin as in FIG. 1. Or, more elaborate procedures may be involved such as attaching flat or other types of connector terminals to the capacitor electrodes, and rendering these terminals flush against the desired position of the inside surface of the capacitor mold of the removable type so that they will be flush with the outside surface of the finished capacitor after encapsulation in polyurethane.

The polyurethane casting resins which are suitable for use herein are generally well-known and are derived from polyisocyanates such as toluene diisocyanate and methylene bis (phenylisocyanate), and polyhydroxy compounds such as polyesters and polyethers having hydroxyl groups. The polyurethane product is a solid product and should not have any voids or bubbles. Isocyanate-capped prepolymers are conventionally employed as the isocyanate component of polyurethane casting mixtures, and are mixed with a polyhydroxy compound (and a catalyst if desired) and cured to form a polyurethane body. In the present invention it is preferred to use the polyurethane systems such as are used for potting electrical components, which result in a somewhat resilient polyurethane body upon curing.

It should be noted that castor oil is a triglyceride oil which is a polyester having isocyanate-reactive hydroxyl groups, and is a suitable component of polyurethane systems for use in the present invention. The castor oil liquid dielectric is accordingly compatible with the polyurethane resin system, to the advantage of the capacitors of the present invention.

The polyurethane casting system should have a "pot life" sufficiently long to permit the introduction of the casting mixture over a period of time and to permit thorough impregnation of the portions of the capacitor or electrode and dielectric assembly which are not filled with the castor oil dielectric. In general it is desirable in this regard that the polyurethane casting mixture have a gel time of more than about 2 hours in a one pound mass at 25°C.

After the casting step, the polyurethane casting mixture is cured, preferably at room temperature, but an elevated temperature of up to about 160°F may be used. The finished capacitor is removed from the mold after curing.

The following Example describes a specific capacitor of the present invention.

EXAMPLE

An electrode and dielectric assembly of the type illustrated in FIGS. 1 and 2 is assembled from 7 capacitor sections. The two electrodes of the capacitor sections are 0.0005 inch thick strips which are 6½ inches wide. The dielectrics are 8 inches wide and are made up of alternating layers of 0.0003 inch capacitor kraft paper and 0.0005 inch MYLAR polyester film which is free of surface contaminants. There are three layers of paper and two layers of polyester film in the dielectric strips which provides for an overlap of the electrode of seven-eighths inch on the top (tab) side of the winding and of five-eighths inch on the bottom side of the winding. The winding of the capacitor sections is started with one "dead turn" of the two dielectric strips, and tab construction is used with 3⅝ inch wide × 0.005 inch thick aluminum tabs laid in at the midpoint of the winding. The tabs are separated by two pieces of 4 inch wide × 0.003 inch thick MYLAR insulators. The electrodes themselves are 260 inches long and result in about 26 turns of winding on each capacitor section.

The windings are wrapped under a moderate tension and are snug and wrinkle-free. The windings are finished off with one complete "dead turn" plus one-fourth inch of the two dielectrics without the electrode. The finished capacitor sections are about 0.33 inch thick (measured perpendicular to the plane of the tabs), and about 5¼ inches wide (measured in the plane of the tabs, parallel to the edges of the electrodes and dielectrics). The seven capacitor sections are aligned and stacked, and series-connected by rolling and crimping the adjacent interior tabs of the stack. G 10 glass fiber-epoxy plates 0.06 inch thick, 5.5 inches wide and 8 inches high are placed at the ends of the stack and the assembly is wrapped with 0.01 inch thick and 1 inch wide G 10 glass filament tape to hold it together. The electrode and dielectric assembly is placed in a vacuum chamber at a temperature of 125°C. and an absolute pressure of 100 microns for 8 hours in order to thoroughly dry it. DB grade castor oil is then introduced into the vacuum chamber to cover the unit and the vacuum is released to thoroughly impregnate the capacitor paper of the dielectric windings. The excess oil is drained and centrifuged off, leaving about 16 ounces of castor oil impregnated in the electrode and dielectric assembly. The impregnated electrode and dielectric assembly is then placed in a mold for polyurethane casting, and a vacuum of 200 microns is established at a temperature of about 90°F. An unpigmented polyurethane casting resin is prepared by thoroughly mixing 54 percent by weight of an isocyanate prepolymer (Vorite prepolymer No. 128 sold by Baker Castor Oil Company) with 46 percent by weight of DB grade castor oil. This system has a gel time in a one pound unit of 20 hours at 25°C. The casting resin is slowly introduced into the vacuumized mold over a period of 2 hours and encapsulates the electrode assembly. The cured polyurethane body provides a leak-proof seal for the capacitor sections, is resilient, and moisture-proof, and results in a capacitor having fully impregnated capacitor sections having a minimum volume of dielectric fluid. The cured polyurethane encapsulated capacitor, with the two end tabs serving as terminals projecting from the cured polyurethane body, weighs slightly over 6 pounds. The electrodes weigh about 2.3 pounds and the dielectrics weigh about 2.5 pounds. The body of the finished capacitor is about 9 inches high, 5½ inches wide, 2 inches thick, and it has a capacitance of $0.22\mu F$. It has a life expectancy of more than 20,000 discharges, a charge voltage capability of about 75 kV (10.3 kV per section), and is able to withstand a voltage gradient of 37.5 kV per inch without breakdown. When operated at a charge voltage of 75 kVDC, the energy content is 610 joules, or an energy density of 100 joules per pound.

Various features of the present invention are set forth in the following claims.

What is claimed is:

1. A high voltage, high density energy storage capacitor comprising a plurality of series-connected capacitor sections, said sections each comprising two aluminum foil electrode strips having a thickness of between about 0.00013 and about 0.002 inch and two composite dielectric interlayer strips separating said electrode strips, said composite interlayer strips being wider and longer than said electrode strips and comprising alternating layers of substantially dry, castor oil impregnated capacitor paper having a thickness of between about 0.0002 to about 0.001 inch and organopolymeric dielectric film having a thickness of between about 0.00025 and about 0.002 inch, said electrode strips and said dielectric strips being arranged and wound in alternating relationship such that the interlayer strips overlap the ends and side edges of the electrode strips and such that said capacitor sections are provided in the form of flattened, generally rectangular windings which are aligned and adjacently stacked, each of said capacitor sections having continuous, substantially dry solid or liquid castor oil dielectric throughout the zone between the aluminum foil electrode strips thereof, a solid, cast polyurethane body intimately encapsulating said capacitor sections to physically integrate and insulate said plurality of stacked capacitor sections, said polyurethane body sealing said castor oil liquid dielectric within said capacitor sections, and said capacitor sections being series-connected internally of said polyurethane body, and terminal means for providing external electrical connection with said series-connected capacitor sections through said polyurethane body, said capacitor having an energy density capability of at least about 100 joules per pound and a charge voltage characteristic of at least about 30 kVDC.

2. A capacitor in accordance with claim 1 wherein said aluminum foil electrode strips are about 0.0005 inch thick, wherein said dielectric interlayer strips comprising alternating layers of capacitor paper polyester film are made up of three layers of said paper each having a thickness of about 0.0003 inch, and two layers of said film each having a thickness of about 0.005 inch and wherein each of said windings has from about 10 to about 40 turns of said electrode strips and said composite dielectric interlayer strips.

3. A capacitor in accordance with claim 2 wherein said polyurethane body is a resilient, unpigmented polyurethane plastic derived from a polyisocyanate and castor oil.

4. A capacitor in accordance with claim 2 wherein electrical connection with the electrode strips of each of said capacitor sections is provided by means of tab connectors in individual electrical contact with the midpoint of the respective aluminum electrode strips, said tap connectors extending from the capacitor sections longitudinally of the respective winding axis of each of said sections, and said series-connection of said capacitor sections being provided by electrical connection of adjacent tab connectors of said aligned and stacked capacitor sections.

5. A capacitor in accordance with claim 4 wherein said capacitor is provided with a rigid end plate adjacent each of the flat exterior surfaces of the respective end capacitor sections of the aligned and adjacently stacked plurality of capacitor sections, and wherein supporting tape is provided circumferentially surrounding the capacitor sections and end plates, said plates and said tape being located internally of said polyurethane body.

6. A capacitor in accordance with claim 1 wherein said organopolymeric film is polyester film.

7. A capacitor in accordance with claim 2 wherein said organopolymeric film is polyester film.

8. A capacitor in accordance with claim 5 wherein said organopolymeric film is polyester film.

* * * * *